June 6, 1944.    C. E. HARTLEY    2,350,890
HONEYCOMB FRAME LIFTER
Filed March 9, 1944    2 Sheets-Sheet 1
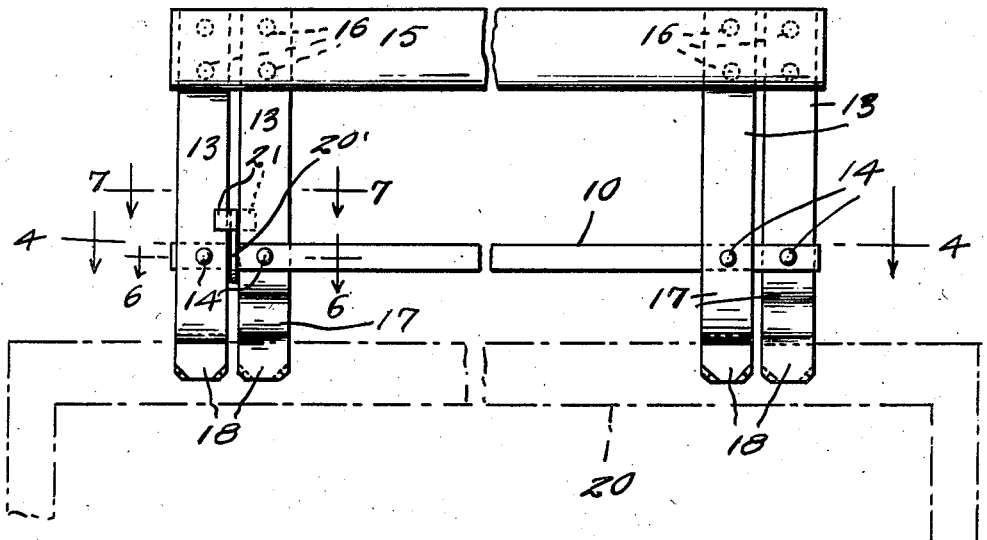
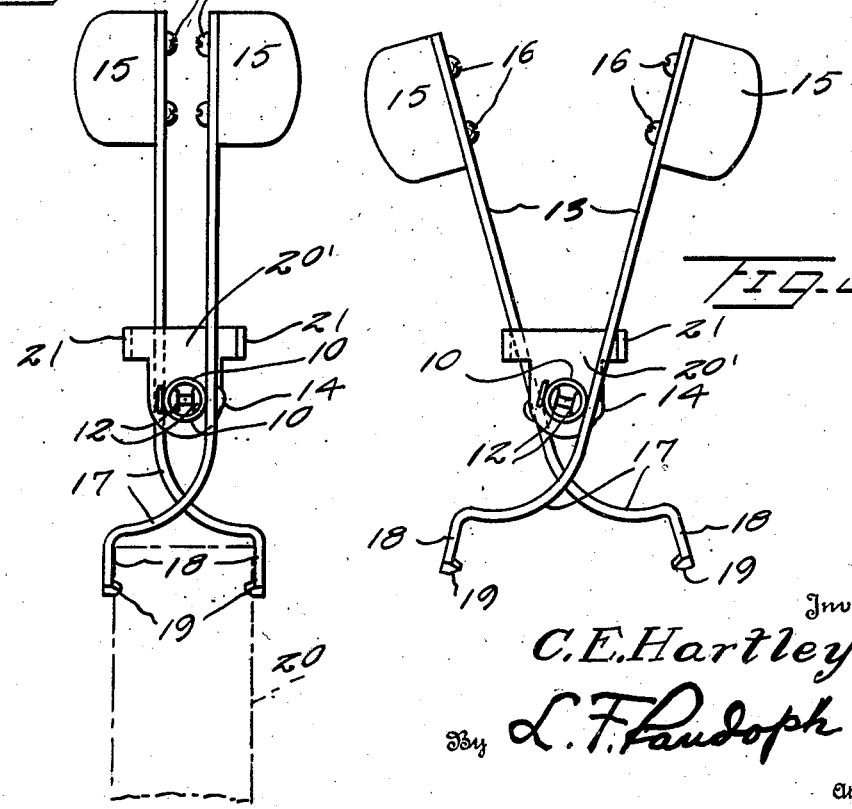
Inventor
C. E. Hartley
By L. F. Randolph
Attorney June 6, 1944.  C. E. HARTLEY  2,350,890
HONEYCOMB FRAME LIFTER
Filed March 9, 1944　　2 Sheets-Sheet 2
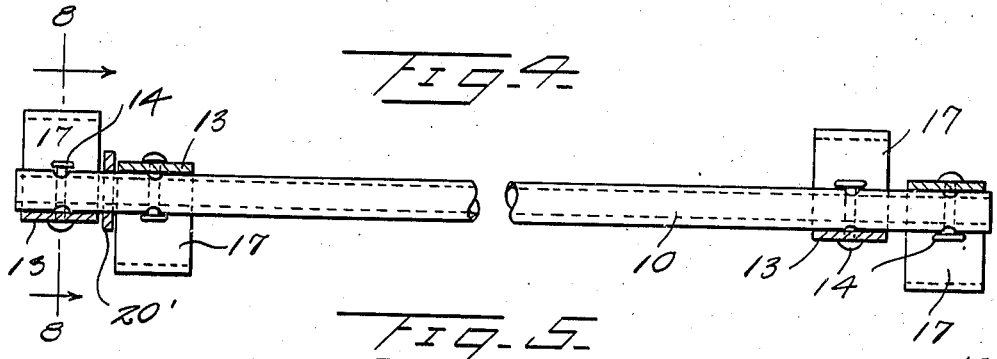
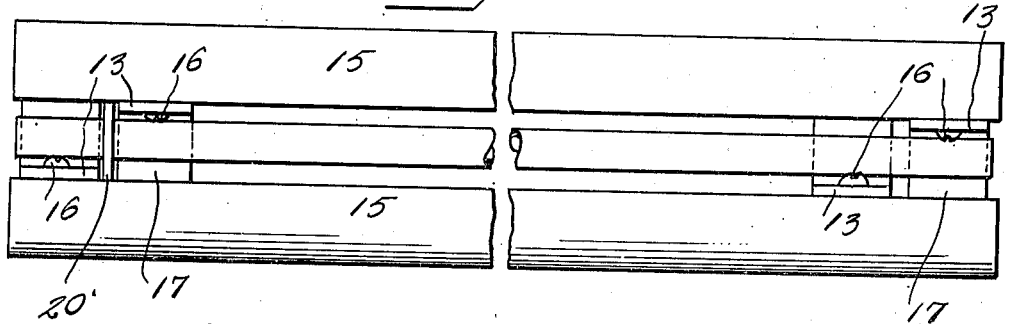
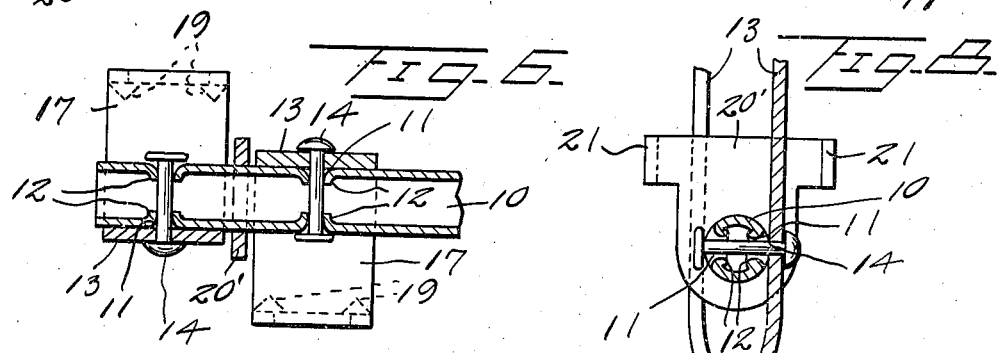
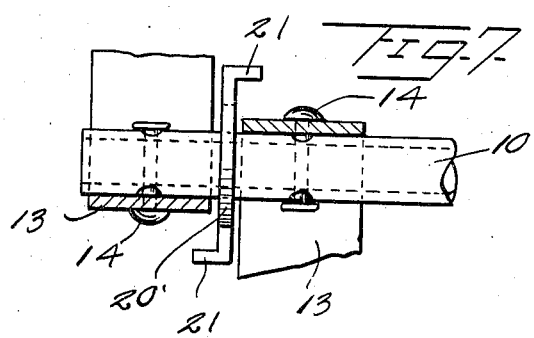
Inventor
C. E. Hartley
By L. F. Randolph
Attorney Patented June 6, 1944

2,350,890

UNITED STATES PATENT OFFICE 2,350,890

HONEYCOMB FRAME LIFTER

Cecil E. Hartley, Utica, Mich.

Application March 9, 1944, Serial No. 525,725

5 Claims. (Cl. 294—106)

This invention relates to a lifter for honeycomb frames.

It is particularly desired to provide a structure which will render the work of lifting honeycomb frames more expeditious, especially making the operation easier and shortening the time incident thereto as well as rendering more thorough, the work of inspecting a colony of honeybees.

I especially provide a structure which may be operated by one hand, one which is exceedingly simple, durable and inexpensive.

Additional objects and advantages will become apparent from a consideration of the description following taken in connection with accompanying drawings illustrating an operative embodiment.

In said drawings:

Figure 1 is a view showing the holder in side elevation in use in connection with a honeycomb frame fragmentarily shown in dotted lines;

Figure 2 is an end view of the parts of Figure 1;

Figure 3 is an end view of the lifter in open position;

Figure 4 is a horizontal section taken on the line 4—4 of Figure 1;

Figure 5 is a top or plan view;

Figure 6 is a detail section taken on the line 6—6 of Figure 1;

Figure 7 is a detail section taken on the line 7—7 of Figure 1; and

Figure 8 is a vertical section taken on the line 8—8 of Figure 4.

Referring specifically to the drawings wherein like reference characters designate like or similar parts, I provide a fulcrum bar at 10 which is preferably tubular. Openings are provided through the bar at 11 by punching the metal inwardly from opposite sides, rather than drilling the same, so that burs 12 will result in order to reinforce the bar about such openings. It will be noted that the axes of all of the openings are coplanar.

Adjacent the ends of the fulcrum bar 10, I provide pairs of opposed levers 13, preferably of metal, of any desired size and shape. Such jaws are pivotally connected for movement about the longitudinal axis of the fulcrum bar 10 and are connected to such bar by means of fastenings 14 in the form of rivets or the like with respect to the shanks of which the openings 11 are sufficiently enlarged to enable said pivotal movement, that is, from the position of Figure 3 to that of Figure 2. The levers 13 on one side of the bar 10 are connected together by a longitudinal handle 15. Screws 16, for instance being passed through the levers into the handle. The remaining levers are connected by a similar handle 15 and screws 16.

The levers 13, below the fulcrum bar 10 have crossed curved portions at 17 and from the latter, jaws 18 depend, having spurs or the like 19 extending inwardly therefrom. Said jaws 18 are adapted for engagement with the top of a honeycomb frame as suggested at 20 with the spurs 19 piercing the same, as shown in Figure 2.

Means are provided to limit the opening of the lifter to the position of Figure 3 which consist of a plate 20 loose on and through which the fulcrum rod 10 passes, the plate being located between adjacent levers of one of the pairs. Such plate has a stop or ear 21 outwardly of one of the levers for abutment thereby to limit opening movement of the levers, while the plate 20 also has a lug or stop 21 extending in the opposite direction and located outwardly to limit the opening of the other lever 13.

In using the device, one of the handles 15 may be held in one hand while the other remains free so that the structure under its weight will separate to the open position of Figure 3. In such position, the curved portions 17 are engaged with the top of the honeycomb frame 20 and with the same hand, can thereupon move the handles 15 toward each other so that the jaws 18 and spurs 19 will grip the honeycomb frame, enabling it to be more easily raised in a shorter length of time, greatly facilitating the handling and inspection of the colonies of honeybees.

Various changes may be resorted to provided they fall within the spirit and scope of the invention.

I claim as my invention:

1. A lifter of the class described comprising levers, a fulcrum bar having openings therethrough, jaws on said levers, said bar having elements passing through said openings and relatively small with respect thereto and connected to the levers, whereby the latter are pivotally mounted.

2. A lifter of the class described comprising levers, a fulcrum bar having openings therethrough, jaws on said levers, said bar having elements passing through said openings and relatively small with respect thereto and connected to the levers, whereby the latter are pivotally mounted, said levers being in two pairs, one pair being located on one side of the longitudinal axis of the fulcrum bar, and the other pair being located on the other side of such longitudinal axis, and handles for the levers of each pair.

3. A lifter of the class described comprising levers, a fulcrum bar having openings therethrough, jaws on said levers, said bar having elements passing through said openings and relatively small with respect thereto and connected to the levers, whereby the latter are pivotally mounted, said levers being in two pairs, one pair being located on one side of the longitudinal axis of the fulcrum bar, the other pair being located on the other side of such longitudinal axis, handles for the levers of each pair, a plate disposed between the levers of one pair through which the bar passes, said plate having lugs extending in opposite directions and arranged to limit the opening movement by contact with the adjacent levers.

4. A lifter of the class described comprising levers, a fulcrum bar having openings therethrough, jaws on said levers, said bar having elements passing through said openings and relatively small with respect thereto and connected to the levers, whereby the latter are pivotally mounted, said levers being in two pairs, one pair being located on one side of the longitudinal axis of the fulcrum bar, the other pair being located on the other side of such longitudinal axis, handles for the levers of each pair, said levers below the fulcrum bar having crossed curved portions, and jaws carried by said portions to grip a honeycomb frame.

5. A lifter of the class described comprising levers, a fulcrum bar having openings therethrough, jaws on said levers, said bar having elements passing through said openings and relatively small with respect thereto and connected to the levers, whereby the latter are pivotally mounted, said levers being in two pairs, one pair being located on one side of the longitudinal axis of the fulcrum bar, the other pair being located on the other side of such longitudinal axis, handles for the levers of each pair, a plate disposed between the levers of one pair through which the bar passes, said plate having lugs extending in opposite directions and arranged to limit the opening movement by contact with the adjacent levers, said levers having crossing curved portions below the fulcrum bar, jaws depending from the curved portions for gripping engagement with the honeycomb frame, and spurs extending from the jaws to penetrate the frame.

CECIL E. HARTLEY.